United States Patent [19]

deRosset

[11] 3,917,734

[45] Nov. 4, 1975

[54] PROCESS FOR THE SEPARATION OF ETHYLBENZENE

[75] Inventor: Armand J. deRosset, Clarendon Hills, Ill.

[73] Assignee: Universal Oil Products Company, Des Plaines, Ill.

[22] Filed: Apr. 8, 1974

[21] Appl. No.: 459,251

[52] U.S. Cl............................ 260/674 SA; 208/310
[51] Int. Cl.²........................................... C07C 7/12
[58] Field of Search................ 260/674 SA; 208/310

[56] References Cited
UNITED STATES PATENTS

| | | | |
|---|---|---|---|
| 3,626,020 | 12/1971 | Neuzil................................. | 260/674 |
| 3,662,014 | 5/1972 | Avrillon et al....................... | 260/674 |
| 3,707,550 | 12/1972 | Stine et al........................... | 260/674 |

Primary Examiner—Delbert E. Gantz
Assistant Examiner—C. E. Spresser
Attorney, Agent, or Firm—James R. Hoatson, Jr.; Thomas K. McBride; William H. Page, II

[57] ABSTRACT

An adsorptive separation process for separating ethylbenzene from a feed mixture comprising ethylbenzene and at least one xylene isomer, which process comprises contacting the feed mixture with a crystalline aluminosilicate adsorbent containing calcium cations at the exchangeable cationic sites whereby there is obtained a fluid raffinate stream comprising ethylbenzene and a rich adsorbent containing said xylene isomer of the feed. A desorption step may then be used to desorb the adsorbed feed component. The process can be either in the liquid or vapor phase.

12 Claims, No Drawings

PROCESS FOR THE SEPARATION OF ETHYLBENZENE

BACKGROUND OF THE INVENTION

1. Field of the Invention

The field of art to which the claimed invention pertains is solid-bed adsorptive separation. More specifically, the claimed invention relates to a process for the separation of ethylbenzene from a feed mixture comprising ethylbenzene and at least one xylene isomer which process employs a solid adsorbent which selectively removes the xylene isomer from the feed mixture thereby producing a fluid raffinate stream comprising ethylbenzene.

2. Description of the Prior Art

It is well known in the separation art that certain crystalline aluminosilicates can be used to separate hydrocarbons species from mixtures thereof. In particular, the separation of normal paraffins from branched chained paraffins can be accomplished by using the type A zeolite which have pore openings from 3 to about 5 Angstroms. Such a separation process is disclosed for example in U.S.. Pat. Nos. 2,985,589 and 3,201,491. These adsorbents allow a separation based on the physical size differences in the molecules by allowing the smaller or normal hydrocarbonss to be passed into the cavities within the crystalline aluminosilicate adsorbent, while excluding the larger or branched chain molecules.

U.S. Pat. Nos. 3,265,750 and 3,510,423 for example disclose processes in which larger pore diameter zeolites such as the type X or type Y structured zeolites can be used to separate olefinic hydrocarbons.

In addition to separating hydrocarbon types, the type X or type Y zeolites have also been employed in processes to separate individual hydrocarbon isomers. In the process described in U.S. Pat. No. 3,114,782, for example, a particular zeolite is used as an adsorbent to separate alkyl-trisubstituted benzene; and in U.S. Pat. No. 3,668,267 a particular zeolite is used to separate specific alkyl-substituted naphthalenes. The more well known selective adsorption processes however are the para-xylene separation processes. In U.S. Pat. No. 3,626,020 for example, a particular zeolite is used to separate para-xylene from a feed mixture comprising para-xylene and at least one other xylene isomer by selectively adsorbing para-xylene over the other xylene isomers. Para-xylene is one of the most commercially important aromatic hydrocarbon isomers. Its used in the manufacture of terephthalic acid which in turn is subsequently employed in the manufacture of various synthetic fibers is well known. One such fiber is Dacron which fiber is a trade-marked product of the duPont Company. The ever increasing demand for such fibers has resulted in a corresponding increase in the demand for para-xylene.

In contrast, the present invention relates to a process for the separation of ethylbenzene from a feed mixture comprising ethylbenzene and at least one other xylene isomer and is therefore distinguished from such xylene isomer separation processes.

We have found that type X or type Y structured zeolites containing calcium cations at exchangeable cationic sites exhibit selectivity for the xylene isomers with respect to ethylbenzene thereby making separation of ethylbenzene from xylene isomers by solid-bed selective adsorption processes possible.

Ethylbenzene is used as a raw material in the production of styrene monomer. Ethylbenzene can be and is commercially produced from the alkylation of benzene with ethylene. The cost of and competing demands for necessary benzene and ethylene feed streams, have however prompted new efforts to recover ethylbenzene from various $C_8$ aromatic feed streams which already contain ethylbenzene. Such feed streams for instance, include $C_8$ aromatic extracts produced by a typical solvent extraction process from a pyrolysis gasoline or from a naphtha which has been reformed with a platinum-halogen-containing catalyst. Additionally $C_8$ aromatic cuts of hydrogenated pyrolysis naphthas or reformates prepared by fractionation without solvent extraction contain varying amounts of ethylbenzene.

The particular utility of the process of my invention is that it offers such a method for recovering ethylbenzene from a feed stream which already contains ethylbenzene.

Ethylbenzene can, of course, be separated from the xylene isomers by fractionation but because its boiling point is within about 4°F, of that of para-xylene, the fractionation can be achieved only with the more intricate super-fractionators. Typical ethylbenzene fractionators contain 300 to 400 actual trays and require about a 25–50 to 1 reflux to feed ratio. The process of my invention therefore offers a competitive alternative to the separation of ethylbenzene by super-fractionation.

SUMMARY OF THE INVENTION

It is, accordingly, a broad objective of my invention to provide a process for the separation of ethylbenzene from a feed mixture comprising ethylbenzene and at least one xylene isomer.

In brief summary, my invention is, in one embodiment, a process for separating ethylbenzene from a feed mixture comprising ethylbenzene and at least one xylene isomer which process comprises contacting said mixture with a crystalline aluminosilicate adsorbent selected from the group consisting of type X and type Y zeolites containing calcium cations at the exchangeable cationic sites within said zeolite whereby there is obtained a fluid raffinate phase comprising ethylbenzene and a rich adsorbent containing said xylene isomer.

More specifically, my invention is, in a more preferred embodiment, a process for separating ethylbenzene isomer from a hydrocarbon feed mixture comprising ethylbenzene at at least one xylene isomer which process comprises the steps of: (a) contacting the feed mixture with a bed of solid adsorbent selected from the group consisting of type X and type Y structured zeolites containing calcium at exchangeable cationic sites at adsorption conditions to effect the selective adsorption of a xylene isomer; (b) withdrawing from the bed of solid adsorbent a stream comprising less selectively adsorbed ethylbenzene; (c) contacting the adsorbent bed at desorption conditions with a desorbent material having an average boiling point substantially different from that of the feed mixture to effect the removal of said xylene isomer; and, (d) withdrawing from the solid adsorbent bed a stream comprising desorbent material and said xylene isomer.

Other embodiments and objects of the present invention encompass details about feed mixtures, adsorbents, desorbents, and operating conditions all of which are hereinafter disclosed in the following discussion of each of these facets of the present invention.

DESCRIPTION OF THE INVENTION

Feed mixtures which can be utilized in the process of this invention will comprise ethylbenzene and at least one xylene isomer. Specifically the feed mixture may contain ethylbenzene and para-xylene or meta-xylene or ortho-xylene. Possible feed mixtures can as well contain in addition to ethylbenzene, any two xylene isomers or all three xylene isomers. The more typical feed mixtures will either be a mixture containing ethylbenzene and all three of the other xylene isomers or a mixture containing ethylbenzene along with para-xylene and meta-xylene. Ortho-xylene which has a boiling point of about 6°F. higher than that of the nearest other $C_8$ aromatic (meta-xylene) can be separated by conventional fractionation techniques and hence may be previously removed from a feed mixture prior to its being charged to the process of this invention. Ortho-xylene fractionator towers for example will contain about 100 to 150 actual trays and will operate with about a 5–8 to 1 reflux to feed ratio.

Mixtures containing substantial quantities of ethylbenzene and xylene isomers generally are produced by reforming and isomerization processes. In reforming processes, a naphtha feed is contacted with a platinum-halogen-containing catalyst at severities selected to produce an effluent containing $C_8$ aromatic compounds which can be subsequently separated using the method of this invention. Xylene isomerization processes generally isomerize a xylene mixture deficient in one or more isomers to give an effluent containing approximately equilibrium quantities of the $C_8$ aromatic isomers which effluent can then be separated using the method of this invention. Generally the $C_8$ aromatics in such effluent streams will be concentrated by solvent extraction processes or by fractionation prior to being introduced into the process of this invention.

The equilibrium compositions of the xylene isomers and ethylbenzene at various temperatures are shown in Table 1 below.

Table 1

| Equilibrium $C_8$ Aromatic Compositions* | | | |
|---|---|---|---|
| Temperature, °C. | 327 | 427 | 527 |
| Mole percent of isomers | | | |
| Ethylbenzene | 6 | 8 | 11 |
| Para-xylene | 22 | 22 | 21 |
| Meta-xylene | 50 | 48 | 45 |
| Ortho-xylene | 22 | 22 | 23 |

*Based on API sources

Since the ethylbenzene boils at about the same temperature as the meta- and para-xylene isomers, fractionation methods are impractical for separating the ethylbenzene from meta- and para-xylene.

Feed mixtures may also contain small quantities of nonaromatics such as straight or branched chain paraffins, cycloparaffins, or olefinic materials. However, since separation of ethylbenzene from a feed mixture by selective adsorption of the xylenes present in the feed mixture on a zeolite adsorbent apparently takes place because of a rather delicate acidity/basicity difference between the xylene isomers and the adsorbent compared to ethylbenzene and the adsorbent it is preferred that these contaminants, especially olefins, be less than about 20 vol. % of the feed mixture passed into the process and more preferably less than about 10 vol. %.

To separate ethylbenzene from a feed mixture containing ethylbenzene and at least one xylene isomer, the mixture is contacted with the adsorbent and the xylene isomer is more selectively adsorbed and retained by the adsorbent while the less selectively adsorbed ethylbenzene is removed from the interstitial void spaces between the particles of adsorbent and the surface of the adsorbent. The adsorbent containing the more selectively adsorbed xylene isomer is referred to as a "rich" adsorbent — rich in the more selectively adsorbed xylene isomer.

The more selectively adsorbed isomer is commonly referred to as the extract component of the feed mixture, while the less selectively adsorbed component is referred to as the raffinate component. Fluid streams leaving the adsorbent comprising an extract component and comprising a raffinate component are referred to, respectively, as the extract stream and the raffinate stream. As previously mentioned, the feed mixture can contain more than one xylene isomer and it will therefore be recognized that all of the xylene isomers will be selectively adsorbed with respect to ethylbenzene. Thus the extract stream will contain as extract components all of the xylene isomers appearing in the feed mixture.

Although it is possible by the process of this invention to produce high purity (98% or greater, expressed as a percent of $C_8$ aromatics present) ethylbenzene at high recoveries, it will be appreciated that an extract component is never completely adsorbed by the adsorbent, nor is a raffinate component completely non-adsorbed by the adsorbent. Therefore, small amounts of a raffinate component can appear in the extract stream and, likewise, small amounts of an extract component can appear in the raffinate stream. The extract and raffinate streams then are further distinguished from each other and from the feed mixture by the ratio of the $C_8$ aromatic isomers appearing in the particular stream. More specifically, the ratio of the more selectively adsorbed xylene isomer to the less selectively adsorbed ethylbenzene isomer will be higher in either the feed mixture or the raffinate stream. Likewise, the ratio of the less selectively adsorbed ethylbenzene isomer to the more selectively adsorbed xylene isomer will be higher in the raffinate stream than in either the feed mixture or the extract stream.

The adsorbent can be contained in one or more chambers where through programmed flow into and out of the chamber separation of the isomers is effected. The adsorbent may be contacted with a desorbent material which is capable of displacing the adsorbed xylene isomer from the adsorbent. Alternatively, the adsorbed xylene isomer could be removed from the adsorbent by purging or by increasing the temperature of the adsorbent or by decreasing the pressure of the chamber or vessel containing the adsorbent or by a combination of these means.

The adsorbent may be employed in the form of a dense compact fixed bed which is alternately contacted with the feed mixture and a desorbent material (hereinafter described). In the simplest embodiment of the invention the adsorbent is employed in the form of a single static bed in which case the process is only semi-continuous. A set of two or more static beds may be employed in fixed-bed contacting with appropriate valving so that the feed mixture is passed through one or more adsorbent beds while the desorbent material is passed through one or more of the other beds in the set.

The flow of feed mixture and desorbent material may be either up or down through the adsorbent. Any of the conventional apparatus employed in static bed fluid-solid contacting may be used.

Moving bed or simulated moving bed systems, however, have a much greater separation efficiency than fixed adsorbent bed systems and are therefore preferred.

Specifically, the more preferred processing flow schemes which can be utilized to effect the process of this invention are those known in the art as simulated moving-bed countercurrent systems. One such system includes the flow scheme described in U.S. Pat. No. 2,985,589 issued to D. B. Broughton. This patent generally describes the processing sequence involved in a particular simulated moving-bed countercurrent solid-fluid contacting process. In fact, the processing sequence generally described in that patent is the preferred mode of operating the separation process disclosed herein.

With that processing sequence therefore, one embodiment of my invention is a process for separating ethylbenzene from a feed mixture comprising ethylbenzene and at least one xylene isomer which process comprises the steps of: contacting said mixture at adsorption conditions with a particular zeolitic adsorbent to effect the selective adsorption of a xylene isomer; withdrawing from the adsorbent bed a stream comprising less selectively adsorbed ethylbenzene; contacting the adsorbent at desorption conditions with a desorbent material to effect the removal of the selectively adsorbed xylene isomer from the adsorbent; and, withdrawing from the adsorbent a stream comprising desorbent material and said selectively adsorbed xylene isomer.

Preferred operating conditions for both adsorption and desorption of this particular embodiment of my invention include a temperature within the range of from about 70° to about 450°F. and a pressure within the range of from about atmospheric to about 500 psig. Furthermore, both adsorption and desorption are preferably affected at conditions selected to maintain liquid phase throughout the feed of adsorbent.

Adsorption and desorption could, of course, be conducted both in the vapor phase or liquid phase or one operation may be conducted in the vapor phase and the other in the liquid phase. Operating pressures and temperatures for adsorption and desorption might be the same or different.

The desorbent materials which can be used in the various processing schemes employing this adsorbent will vary depending on the type of operation employed. The term "desorbent material" as used herein means any fluid substance capable of removing a selectively adsorbed isomer from the adsorbent. In the swing-bed system in which the selectively adsorbed isomer is removed from the adsorbent by a purge system, gaseous hydrocarbons such as methane, ethane, etc. or other types of gases such as nitrogen or hydrogen may be used at elevated temperatures or reduced pressure or both to effectively purge the adsorbed isomer from the adsorbent.

However, in processes which are generally operated at substantially constant pressures and temperatures to insure liquid phase, the desorbent material relied upon must be judiciously selected in order that it may displace the adsorbed isomer from the adsorbent with reasonable mass flow rates and also without unduly preventing the adsorbed isomer from displacing the desorbent in a following adsorption cycle.

Desorbent materials which can be used in the process of this invention should additionally be substances which are easily separable from the feed mixture that is passed into the process. In desorbing the preferentially adsorbed component of the feed, both desorbent and the extract component are removed from the adsorbent in admixture. Without a method of separation of these two materials, the purity of the extract component of the feed stock would not be very high since it would be diluted with desorbent. It is contemplated that any desorbent material used in this process will have a substantially different average boiling point than that of the feed mixture. More specifically, "substantially different" shall mean that the difference between the average boiling points shall be at least 20°F. The boiling range of the desorbent material could be higher or lower than that of the feed mixture. The use of a desorbent material having a substantially different average boiling point than that of the feed allows separation of desorbent material from feed components in the extract and raffinate streams by simple fractionation or other methods thereby permitting reuse of desorbent material in the process.

In the preferred isothermal, isobaric, liquid-phase operation of the process of my invention, I have found that aromatic-containing desorbent materials are particularly effective. Specifically, toluene- and diethylbenzene-containing desorbents are especially preferred for this type of operation. Mixtures of these aromatics with non-aromatics such as paraffins have additionally been found to be particularly effective.

One can appreciate that certain characteristics of adsorbents are highly desirable, if not absolutely necessary, to the successful operation of a selective adsorption process. Among such characteristics are: adsorptive capacity for some volume of an extract component per volume of adsorbent; the selective adsorption of an extract component with respect to a raffinate component and the desorbent; and sufficiently fast rates of adsorption and desorption of the extract component to and from the adsorbent.

Capacity of the adsorbent for adsorbing a specific volume of an extract component (a xylene isomer in the process of my invention) is, of course, a necessity; without such capacity the adsorbent is useless for adsorptive separation. Furthermore, the higher the adsorbent's capacity for an extract component the better is the adsorbent. Increased capacity of a particular adsorbent makes it possible to reduce the amount of adsorbent needed to separate the extract component contained in a particular charge rate of feed mixture. A reduction in the amount of adsorbent required for a specific adsorptive separation reduces the cost of the separation process. It is important that the good initial capacity of the adsorbent be maintained during actual use in the separation process over some economically desirable life.

The second necessary adsorbent characteristic is the ability of the adsorbent to separate components of the feed; or, in other words, that the adsorbent possess adsorptive selectivity, (B), for one component as compared to another component. Selectivity can be expressed not only for one feed as compared to another but can also be expressed between any feed mixture component and the desorbent. The selectivity, (B), as used throughout this specification is defined as the ratio of the two components of the adsorbed phase over the ratio of the same two components in the unadsorbed phase at equilibrium conditions.

Selectivity is shown in equation 1 below:

Equation 1

$$\text{Selectivity} = (B) = \frac{[\text{vol. percent } C/\text{vol. percent } D]_A}{[\text{vol. percent } C/\text{vol. percent } D]_U}$$

where C and D are two components of the feed represented in volume percent and the subscripts A and U represent the adsorbed and unadsorbed phases respectively. The equilibrium conditions as defined here were determined when the feed passing over a bed of adsorbent did not change composition after contacting the bed of adsorbent. In other words, there was no net transfer of material occurring between the unadsorbed and adsorbed phases.

As can be seen where the selectivity of two components approaches 1.0 there is no preferential adsorption of one component by the adsorbent. As the (B) becomes less than or greater than 1.0 there is a preferential selectivity by the adsorbent of one component. When comparing the selectivity of the adsorbent of one component C over component D, a (B) larger than 1.0 indicates preferential adsorption of component C within the adsorbent. A (B) less than 1.0 would indicate that component D is preferentially adsorbed leaving an unadsorbed phase richer in component C and an adsorbed phase richer in component D. Desorbents ideally would have a selectivity equal to about 1 or slightly less than 1.

The third important characteristic is the rate of exchange of the adsorbed isomer with the desorbent or, in other words, the relative rate of desorption of the adsorbed isomer. This characteristic relates directly to the amount of desorbent that must be employed in the process to recover the adsorbed isomer from the adsorbent.

In order to test various adsorbents to measure the characteristics of adsorptive capacity and selectivity, a dynamic testing apparatus is employed. The apparatus consists of an adsorbent chamber of approximately 70 cc. volume having inlet and outlet portions at opposite ends of the chamber. The chamber is contained within a temperature control means and, in addition, pressure control equipment is used to operate the chamber at a constant predetermined pressure. Chromatographic analysis equipment can be attached to the outlet line of the chamber and used to analyze "on-stream" the effluent stream leaving the adsorbent chamber.

A pulse test, performed using this apparatus and the following general procedure, is used to determine selectivities and other data for various adsorbent systems. The adsorbent is filled to equilibrium with a particular desorbent by passing the desorbent material through the adsorbent chamber. At a convenient time, a pulse of feed containing known concentrations of a non-adsorbed paraffinic tracer (n-nonane for instance) and of the particular $C_8$ aromatic isomers all diluted in desorbent is injected for a duration of several minutes. Desorbent flow is resumed, and the tracer and the aromatic isomers are eluted as in a liquid-solid chromatographic operation. The effluent can be analyzed by on-stream chromatographic equipment and traces of the envelopes of corresponding component peaks developed. Alternatively, effluent samples can be collected periodically and later analyzed separately by gas chromatography.

From information derived from the chromatographic traces, adsorbent performance can be rated in terms of capacity index for an extract component, selectivity for one isomer with respect to the other, and the rate of desorption of extract component by the desorbent. The capacity index may be characterized by the distance between the center of the peak envelope of the selectivity adsorbed isomer and the peak envelope of the tracer component or some other known reference point. It is expressed in terms of the volume in cubic centimeters of desorbent pumped during this time interval. Selectivity, (B), for the non-adsorbed isomer with respect to the adsorbed isomer may be characterized by the ratio of the distance between the center of the non-adsorbed isomer peak envelope and the tracer peak envelope (or other reference point) to the corresponding distance for the other (adsorbed) isomer. The rate of exchange of an adsorbed isomer with the desorbent can generally be characterized by the width of the peak envelopes at half intensity. The narrower the peak width the faster the desorption rate. The desorption rate can also be characterized by the distance between the center of the tracer peak envelope and the disappearance of a selectively adsorbed isomer which has just been desorbed. This distance is again the volume of desorbent pumped during this time interval.

To translate this type of data into a practical separation process requires actual testing of the best system in a continuous countercurrent liquid-solid contacting device. The general operating principles of such a device have been previously described and are found in Broughton U.S. Pat. No. 2,985,589. A specific laboratory-size apparatus utilizing these principles is described in deRosset et al U.S. Pat. No. 3,706,812. The equipment comprises multiple adsorbent beds with a number of access lines attached to distributors within the beds and terminating at a rotary distributing valve. At a given valve position, feed and desorbent are being introduced through two of the lines and raffinate and extract are being withdrawn through two more. All remaining access lines are inactive and when the position of the distributing valve is advanced by one index all active positions will be advanced by one bed. This simulates a condition in which the adsorbent physically moves in a direction countercurrent to the liquid flow. Additional details on the above-mentioned adsorbent testing apparatus and adsorbent evaluation techniques may be found in the paper "Separation of $C_8$ Aromatics by Adsorption" by A. J. deRosset, R. W. Neuzil, D. J. Korous and D. H. Rosback presented at the American Chemical Society, Los Angeles, Cal., Mar. 28 through Apr. 2, 1971.

The feasibility of separating ethylbenzene from a feed mixture comprising ethylbenzene and at least one xylene isomer by selective adsorption of the xylene isomer, which was demonstrated by pulse test results, was confirmed by continuous testing in the laboratory-sized apparatus described above.

Adsorbents which can be used in the process of this invention are generally referred to as the cyrstalline aluminosilicates or molecular sieves and can comprise both the natural and synthetic aluminosilicates. Particular crystalline aluminosilicates encompassed by the present invention include crystalline aluminosilicate cage structures in which the alumina and silica tetrahedra are intimately connected in an open three dimensional network. The tetrahedra are cross-linked by the sharing of oxygen atoms with spaces between the tetrahedra occupied by water molecules prior to partial or total dehydration of this zeolite. The dehydration of the zeolite results in crystals interlaced with cells having molecular dimensions. Thus, the crystalline aluminosilicates are often referred to as molecular sieves when the separation which they effect is dependent essentially upon distinction between molecules sizes as, for instance, when normal paraffins are separated from isoparaffins by using a particular crystalline aluminosilicate. In the process of this invention, however, the term molecular sieves is not strictly suitable since the separation of specific $C_8$ aromatic isomers is dependent on electrochemical attraction of different isomer configurations rather than pure physical size differences in the isomer molecules.

In hydrated form, the crystalline aluminosilicates generally encompass those zeolites represented by the Formula 1 below:

FORMULA 1

$$M_{2/n}O:Al_2O_3:wSiO_2:yH_2O$$

where M is a cation which balances the electrovalence of the tetrahedra and is generally referred to as an exchangeable cationic site, $n$ represents the valence of the cation, $w$ represents the moles of $SiO_2$ and $y$ represents the moles of water. The cations may be any one of a number of cations which will be hereinafter described in detail.

The type X structured and type Y structured zeolites as used in this specification shall include crystalline aluminosilicates having a three dimensional interconnected cage structure and can specifically be defined by U.S. Pat. Nos. 2,882,244 and 3,130,007. The terms "type X structured" and "type Y structured" zeolites as used herein shall include all zeolites which have a general structure as represented in the above two cited patents and additionally shall specifically include those crystalline aluminosilicates produced from either of the zeolites described in U.S. Pat. Nos. 2,882,244 and 3,130,007 as starting materials by various ion exchange techniques or thermal treatments or combinations thereof to in any way modify the properties (such as pore diameter or cell size) of the type X or type Y zeolite starting material. As an example, the modified type Y zeolite produced by the thermal treatment of an ammonium-exchanged type Y zeolite in the presence of water vapor, as described in U.S. Pat. No. 3,506,400, shall be included within the term "type Y structured zeolite" as shall any zeolite produced by subsequent ion-exchange of the modified type Y zeolite so produced. In the most limiting sense only these terms refer to type X and type Y zeolites.

The type X structured zeolite can be represented in terms of mole oxides as represented in formula 2 below:

FORMULA 2

$$(0.9\pm0.2)M_{2/n}O:Al_2O_3:(2.5\pm0.5)SiO_2:yH_2O$$

where M represents at least one cation having a valence of not more than 3, $n$ represents the valence of M and $y$ is a value up to about 9 depending upon the identity of M and the degree of hydration of the crystalline structure.

The type Y structured zeolite can be represented in terms of the mole oxides for the sodium form as represented by Formula 3 below:

FORMULA 3

$$(0.9\pm0.2)Na_2O:Al_2O_3:wSiO_2:yH_2O$$

where $w$ is a value of greater than about 3 up to 8, and $y$ may be any value up to about 9.

Adsorbents contemplated herein include not only the sodium forms of the type X and type Y zeolites but also crystalline materials obtained from such a zeolite by partial or complete replacement of the sodium cations with other individual cations as hereinbelow specified. The term "exchangeable cationic sites" for the type X and type Y zeolites generally refers to the sites occupied by sodium cations present in the type X and type Y zeolite as indicated in Formula 2 and Formula 3 above and which can be replaced or exchanged with other cations to modify the properties of these zeolites.

Cationic or base exchange methods are generally known to those familiar with the field of crystalline aluminosilicate production. They are generally performed by contacting the sodium form of the zeolite with an aqueous solution of the soluble salt of the cation or cations desired to be placed upon the zeolite. After the desired degree of exchange takes place the sieves are removed from the aqueous solution, washed and dried to a desired water content. It is contemplated that cation exchange operations may take place by using individual solutions of the desired cations to be placed on the zeolite or by using an exchange solution containing a mixture of cations, where two or more desired cations are to be placed on the zeolite.

For the particular separation of this invention where ethylbenzene is to be separated as a raffinate component, it is, of course, necessary that the value of the ethylbenzene selectivity with respect to any of the xylene isomers be less than 1.0 indicating that ethylbenzene will be rejected rather than adsorbed by the adsorbent. The lower the selectivity value expressed in this manner, the better is the adsorbent's ability to reject ethylbenzene.

I have found that for the process of this invention a crystalline aluminosilicate adsorbent selected from the group consisting of type X and type Y zeolites containing calcium cations at the exchangeable cationic sites satisfies this selectivity requirement and the other adsorbent requirements previously discussed and is therefore preferred.

Suitable adsorbents containing different levels of calcium can be prepared by ion exchanging sodium-form type X or type Y zeolites to the desired calcium content. A zeolite commercially available from the Linde Company, Tonawanda, New York, under the trade name "Molecular Sieves 13X" can, for instance, be ion exchanged to produce a suitable calcium-containing zeolitic adsorbent. Particularly suitable for use as an adsorbent in the process of this invention is the calcium-containing type X zeolite also available commercially from the same company under the trade name "Molecular Sieves 10X."

The calcium content of the type X or type Y zeolite used as adsorbents in this process will preferably be from about 2 to about 15 wt. % calcium and more preferably will be from about 9 to about 15 wt. % calcium. I have discovered that as the calcium content of an exchanged sodium-type X zeolite is increased from about 3 wt. % to about 9 wt. % the zeolite when used as an adsorbent demonstrates an increasing ability to reject ethylbenzene and adsorb the xylene isomers. It is believed that an increasing adsorption acidity is developed as the degree of calcium exchange progresses over this range. This effect, shown in Table 2 below, appears to level off at about 9 wt. % calcium.

Table 2

Effect of Ca Content on Selectivity of Ca-Na-Type X Zeolite

| Adsorbent | A | B | C | D |
|---|---|---|---|---|
| wt. % Ca | 2.86 | 5.74 | 8.8 | 14.4 |
| Pulse Test | 1 | 2 | 3 | 4 |
| Selectivity, (B) | | | | |
| EB/p-x | 0.94 | 0.90 | 0.76 | 0.64 |
| EB/m-x | 0.80 | 0.52 | 0.33 | 0.27 |
| EB/o-x | 0.68 | 0.46 | 0.39 | 0.33 |

Adsorbents A, B, C and D were prepared by exchanging different portions of a sodium-type X zeolite of approximately 20-40 mesh particle size with 0.15 N CaCl$_2$ solution from one to four times per portion to achieve the different calcium contents. All adsorbents were dried in the same manner to achieve as nearly as possible the same water content for each and the adsorbents were tested by the pulse test previously described. The data shows that as the calcium content increases from 2.86 wt. % for Adsorbent A to 8.8 for Adsorbent C, the ethylbenzene selectivities decreased indicating an increasing ability to reject ethylbenzene and adsorb the xylenes. From 8.8 wt. % to 14.4 wt. % calcium the selectivity decrease was small.

In the process of this invention I have additionally found that the amount of water present on the zeolite adsorbent, as measured by loss on ignition at a certain temperature, is critical to the performance of the adsorbent. The amount of water present on the adsorbent is critical because too much water can increase rather than decrease ethylbenzene to xylene isomer selectivities and can additionally decrease adsorptive capacities. In this specification, the volatile matter (water) content of the zeolitic adsorbent is determined by first weighing the adsorbent and thereafter contacting the adsorbent in a high temperature furnace at a temperature of from about 400°C. to about 900°C. under an inert purge gas stream such as nitrogen for a period of time sufficient to achieve a constant weight. The sample is then cooled under an inert atmosphere and weighed to determine the difference in weight between the adsorbent before it was passed into the oven and afterwards. The difference in weight is calculated as a loss on ignition (LOI) and represents the volatile matter present on or within the adsorbent.

More specifically, I have found that as the amount of water on the adsorbent increases the adsorbent's ability to reject ethylbenzene and adsorb the xylene isomers decreases. Stating this effect in terms of selectivity, as the water content of the adsorbent increases the ethylbenzene to xylene isomer selectivities also increases. The exact mechanics by which water changes the adsorbent's selectivity for ethylbenzene with respect to the xylene isomers is not fully understood, but it is thought that in some way it increases the acidity of the adsorbent. The effect of water on adsorbent performance is shown in Table 3 below.

Table 3

Effect of Water Level (LOI at 500° C.) on Adsorbent Performance

| Adsorbent | A | B | C | D | E |
|---|---|---|---|---|---|
| Drying Temp., °C. | 300 | 250 | 200 | — | 150 |
| LOI at 500°C. | 1.02 | 1.95 | 2.94 | 6.54 | 7.64 |
| Pulse Test No. | 1 | 2 | 3 | 4 | 5 |
| Selectivities | | | | | |
| e/p | 0.50 | 0.56 | 0.60 | 0.83 | 0.88 |
| e/m | 0.29 | 0.33 | 0.43 | 0.70 | 0.88 |
| e/o | 0.33 | 0.36 | 0.41 | 0.57 | 0.65 |
| Envelope Width,cc | | | | | |
| n-C$_9$ | 10.9 | 10.8 | 11.1 | 10.2 | 9.9 |
| eb | 10.9 | 11.2 | 11.7 | 11.0 | 12.1 |
| p | 10.3 | 11.2 | 11.7 | 11.1 | 11.9 |
| m | 12.4 | 12.7 | 12.2 | 11.4 | 12.1 |
| o | 12.0 | 12.6 | 12.5 | 11.8 | 11.7 |
| Net Retention Vol.,cc | | | | | |
| eb | 4.1 | 4.1 | 4.4 | 4.2 | 3.9 |
| p | 8.2 | 7.4 | 7.4 | 5.0 | 4.4 |
| m | 14.2 | 12.4 | 10.4 | 6.0 | 4.4 |
| o | 12.5 | 11.6 | 11.0 | 7.3 | 6.1 |

Table 3 shows results of pulse tests made on 10X sieves with toluene desorbent after drying portions of the adsorbent to various water contents. The original material was air equilibrated to 6.54 wt. % L.O.I. at 500°C. and then dried in a muffle furnace for 2 hours at the various temperatures indicated. At 150°C. the adsorbent actually picked up more water.

Selectivities were the highest for a pulse test 5 on Adsorbent E which contained the highest amount of water, 7.64 wt. %. Although the selectivities for that test are all less than 1.0, indicating that the adsorbent will still selectively adsorb the xylene isomers over ethylbenzene, they are in fact approaching 1.0 where the adsorbent would possess no tendancy to adsorb either the xylene isomers or ethylbenzene. As the water content decreases the selectivity values become smaller indicating the adsorbent's increased ability to reject ethylbenzene and adsorb the xylene isomers.

Note also that the net retention volumes, indicative of adsorbent capacity, decreases as the water content increased. Water had little or no effect on envelope widths which are indicative of rates of adsorption-desorption of the adsorbed xylene isomers.

It can be seen therefore that the water content of the adsorbent as measured by loss on ignition at 500°C. has an important effect upon adsorbent performances. Adsorbent water content is therefore an important process variable especially in continuous processes where the tendancy might be for the adsorbent to loose water with time. Although Table 3 indicates that the adsorbent will still function with a water content as high as 7.6 wt. %, the preferred water content of the adsorbent will be from about 0.2 to about 3 wt. % water measured by loss on ignition at 500°C. This amount of water may be maintained if necessary by adding water to the adsorbent either on an intermittent or more preferably on a continuous basis by itself or in admixture with feed or desorbent material to maintain the desired concentrations of water on the adsorbent.

EXAMPLE

In this example three tests were run in order to demonstrate the effectiveness and utility of the process of my invention by performing efficient high-purity separations of ethylbenzene from a feed mixture containing ethylbenzene and at least one xylene isomer.

The testing apparatus which was used was much different than the pulse test apparatus previously discussed. The apparatus used herein was essentially a pilot plant scale version of a fixed bed apparatus through which fluid flow was directed to maintain counter-current operations which simulated a moving bed type of operation.

The apparatus consisted essentially of 24 serially connected sieve chambers having about 44 cc. volume each. Total chamber volume of the apparatus was approximately 1,056 cc. The individual sieve chambers were serially connected to each other with relatively small diameter connecting piping together with auxiliary lines leading to a rotary type valve. The valve had inlet and outlet ports which connected certain of the auxiliary lines which flowed into the conduits connecting the chambers to external input or output lines. By manipulating the rotary valve and maintaining given pressure differentials and flow rates through the various lines passing into and out of the series of chambers, a simulated countercurrent flow was produced. The adsorbent remains stationary while fluid flowed throughout the serially connected chambers in a manner which when viewed from any position within the adsorbent chambers was steady countercurrent flow. The moving of the rotary valve was done in a periodic shifting manner. The shifting of the rotary valve was done in order to allow a new operation to take place in the adsorbent beds located between the active inlet and outlet ports of the rotary valve.

The rotary valve basically contained two input lines and two output lines through which fluids to and from the process flowed. The rotary valve contained a feed input line through which passed a feed mixture containing ethylbenzene and xylene isomers, an extract stream outlet line through which passes desorbent material in admixture with the selectively retained xylene isomers of the feed mixture, a desorbent material inlet line through which passed desorbent materials and a raffinate stream outlet line through which passed the less selectively retained ethylbenzene in admixture with desorbent material. Additionally, a flush material inlet line was used to admit flush material for the purpose of flushing feed components from lines which had previously contained feed material after the feed material stream has been shifted by the rotary valve to a new advanced position during a new period of operations. The flush material employed was generally desorbent material which then left the apparatus as part of the extract stream and raffinate stream.

It will be readily appreciated that both the apparatus employed and the operations taking place within the operation are quite detailed. Nonetheless, it is not considered necessary for purposes of this example to include further details. Additional apparatus details can be found in U.S. Pat. No. 3,706,812, of which the applicant is a co-author. In order to better understand the operations taking place within the apparatus reference can be made to D. B. Broughton et al., "The Separation of P-Xylene from C₈ Hydrocarbon Mixtures by the Parex Process," presented at the Third Joint Annual Meeting, American Institute of Chemical Engineers and Puerto Rican Institute of Chemical Engineers, San Juan, Puerto Rico, May 17 through May 20, 1970. This reference describes in detail the basic operations taking place in the testing apparatus used in this Example.

During the test of this Example the temperature of the adsorbent and the materials passing into the apparatus were maintained at approximately 150°C. with the plant pressure being maintained at about 100 psig. The desorbent material used was toluene as was the flush material. The feed stock used in this Example was essentially a $C_8$ aromatic hydrocarbon heart-cut which contained about 32.0 vol. % ethylbenzene, 14.3 vol. % para-xylene, 33.3 vol. % meta-xylene and about 20.4 vol. % of ortho-xylene.

The adsorbent used was Linde 10X Molecular Sieves of approximately 20–40 particle size range. The apparatus was loaded with 1056 ml of the adsorbent and then dried for 20 hours with 2.5 gm mol/hr of vapor phase toluene at 150°C. and atmospheric pressure. After the drying, the adsorbent was rehydrated to a known water content by passing wet nitrogen over the adsorbent beds. A water bubbler was inserted in a nitrogen line and each of the 24 beds was exposed to the wet nitrogen stream at 23°C., 150 ml/min., for 1 hour. A check of the water bubbler after all of the beds had been rehydrated in this manner indicated that 6 grams of water had been added to the adsorbent which corresponds to 0.85 wt. % of the adsorbent.

The three tests, which were run after operating conditions had been adjusted for high purity and high efficiency operation, were performed to indicate the high ethylbenzene purities and efficiencies which can be obtained from the process of this invention. It is fully expected that ethylbenzene can be separated at a purity of 99% and higher with a recovery or efficiency in excess of 95%. "Efficiency" is determined by calculating the amount of ethylbenzene which is lost through the extract stream, determining this quantity as a percentage of the ethylbenzene fed into the process and subtracting this percentage from 100 percent. It represents the percentage of ethylbenzene which is fed to the process which is not lost to the extract stream. The purity of the ethylbenzene present in the raffinate stream can be obtained by analyzing the $C_8$ aromatic hydrocarbon distribution of the raffinate stream.

The test results are shown in Table 4 below.

Table 4

| Test | Test Results | | |
|---|---|---|---|
| | A | B | C |
| Flow Rates | | | |
| Feed in, cc/hr | 62 | 61 | 65 |
| Flush in | 51 | 47 | 48 |
| Desorbent in | 378 | 388 | 390 |
| Extract out | 272 | 208 | 205 |
| Raffinate out | 219 | 288 | 298 |
| Extract | | | |
| Distribution of $C_8$ Aromatics | | | |
| Ethylbenzene, vol. % | 2.8 | 0.4 | 0.3 |
| Para-xylene, vol. % | 19.7 | 18.8 | 19.2 |
| Meta-xylene, vol. % | 48.1 | 51.4 | 51.3 |
| Ortho-xylene, vol. % | 29.4 | 29.4 | 29.2 |
| Raffinate | | | |
| Distribution of $C_8$ Aromatics | | | |
| Ethylbenzene, vol. % | 98.2 | 98.3 | 98.5 |
| Para-xylene, vol. % | tr | — | — |
| Meta-xylene, vol. % | 0.3 | 0.5 | 0.3 |
| Ortho-xylene, vol. % | 1.5 | 1.2 | 1.2 |
| Efficiency, % | 98.6 | 98.2 | 98.6 |

The relatively high-purity, high-efficiency capability of this process is demonstrated by the values reported above for volume percent ethylbenzene in the raffinate and for extraction efficiency. In these three tests purities of about 98 vol. % at efficiencies of over 98% were obtained.

By altering the input and output stream passing into and out of the process, the characteristics of the flow patterns could be slightly altered to effect either higher efficiencies with relatively lower ethylbenzene purities or relatively higher ethylbenzene purities with relatively lower efficiencies.

The above Example is illustrative of a specific embodiment of the process of this invention and is not considered as an undue limitation on the scope of the attached claims.

I claim as my invention:

1. A process for separating ethylbenzene from a feed mixture comprising ethylbenzene and a plurality of xylene isomers which comprises contacting said mixture with a crystalline aluminosilicate adsorbent consisting essentially of X or Y zeolite containing at the exchangeable cationic sites within said zeolite from about 2 to about 15 wt. % calcium, said zeolite also containing from about 0.2 to about 3 wt. % $H_2O$ measured by loss on ignition at 500°C., selectively adsorbing substantially all of said xylene isomers in said adsorbent to the substantial exclusion of the ethylbenzene, and recovering a high-purity ethylbenzene raffinate.

2. The process of claim 1 further characterized in that said feed mixture contains para-xylene.

3. The process of claim 1 further characterized in that said feed mixture contains ortho-xylene.

4. The process of claim 1 further characterized in that said feed mixture contains meta-xylene.

5. The process of claim 1 further characterized in that said feed mixture contains para-xylene and one other xylene isomer.

6. The process of claim 1 further characterized in that said feed mixture contains para-xylene, meta-xylene and ortho-xylene.

7. The process of claim 1 including the step of treating the adsorbent containing said isomers with a desorbent material to remove the adsorbed component therefrom as a fluid extract stream.

8. The process of claim 7 further characterized in that said desorbent material has an average boiling point substantially different from that of the feed mixture.

9. The process of claim 8 further characterized in that said desorbent material comprises toluene.

10. The process of claim 8 further characterized in that said desorbent material comprises diethylbenzene.

11. The process of claim 1 further characterized in being effected at a temperature within the range of from about 70°F. to about 450°F. and at a pressure within the range of from about atmospheric to about 500 psig.

12. The process of claim 11 further characterized in being effected in the liquid phase.

* * * * *